United States Patent
Mittal et al.

(10) Patent No.: US 12,354,411 B1
(45) Date of Patent: Jul. 8, 2025

(54) APPARATUS AND METHOD FOR ASSIGNING FINANCIAL TRANSACTION DOCUMENT IMAGES TO RESPECTIVE MODELS FOR FRAUD DETECTION BASED ON DOCUMENT IMAGE CHARACTERISTICS

(71) Applicant: Morgan Stanley Services Group Inc., New York, NY (US)

(72) Inventors: Atul Mittal, Karnataka (IN); Sonu Agarwal, Karnataka (IN); Joe Manjiyil, Karnataka (IN); Neeta Pande, Karnataka (IN); Sandeep Ramesh, Plano, TX (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/915,921

(22) Filed: Oct. 15, 2024

(51) Int. Cl.
G06V 40/30 (2022.01)
G06V 30/22 (2022.01)
G06V 30/41 (2022.01)
G06V 30/42 (2022.01)

(52) U.S. Cl.
CPC ............. *G06V 40/33* (2022.01); *G06V 30/22* (2022.01); *G06V 30/41* (2022.01); *G06V 30/42* (2022.01)

(58) Field of Classification Search
CPC ........ G06V 40/33; G06V 30/22; G06V 30/41; G06V 30/42
See application file for complete search history.

(56) References Cited

U.S. PATENT DOCUMENTS

| | | | |
|---|---|---|---|
| 9,406,030 B2 * | 8/2016 | Dolev | G06N 20/00 |
| 10,043,073 B2 * | 8/2018 | Ross | B07C 5/3422 |
| 11,106,891 B2 | 8/2021 | Sangala et al. | |
| 11,436,579 B2 | 9/2022 | Hall et al. | |
| 11,521,428 B1 | 12/2022 | Filatov et al. | |
| 11,893,505 B1 * | 2/2024 | Fleming | G06F 16/93 |
| 2016/0125400 A1 * | 5/2016 | Hu | G06Q 20/34 |
| | | | 705/44 |
| 2017/0046560 A1 * | 2/2017 | Tsur | G06Q 20/325 |

(Continued)

*Primary Examiner* — Andrew M Moyer
*Assistant Examiner* — Ahmed A Nasher
(74) *Attorney, Agent, or Firm* — Leason Ellis LLP

(57) ABSTRACT

A method and an apparatus that includes performing a material alteration detection process: sampling the document images based at least in part on account information indicated on the document images; performing image pre-processing on the sampled document images; determining a document type for each image of the sampled document images; for handwritten documents, analyzing the document image using a machine learning (ML) algorithm trained to detect material alterations on handwritten documents; for printed documents, analyzing the document image using a ML algorithm trained to detect material alterations on printed documents; and outputting a fraud probability representation for each analyzed document image; and a signature forgery detection process: obtaining past signatures corresponding to the document images; performing signature image pre-processing; authenticating each signature using the past signatures and a ML algorithm trained to match signatures; outputting a similarity measure; and adjusting the outputted similarity measure based on additional account information.

20 Claims, 11 Drawing Sheets

(56) References Cited

U.S. PATENT DOCUMENTS

| | | |
|---|---|---|
| 2020/0167772 A1 | 5/2020 | Chakraborty et al. |
| 2021/0117529 A1 | 4/2021 | Zamora Martínez et al. |
| 2021/0374756 A1 | 12/2021 | Pandey et al. |
| 2022/0156756 A1 | 5/2022 | Eapen et al. |
| 2022/0253950 A1 | 8/2022 | Das et al. |
| 2023/0004747 A1* | 1/2023 | Zhu ..................... G06N 3/0464 |
| 2023/0177873 A1 | 6/2023 | Shulhat et al. |
| 2023/0281951 A1 | 9/2023 | Garcia-Cotte |
| 2023/0351778 A1 | 11/2023 | Fitzgerald |
| 2023/0351785 A1 | 11/2023 | Fitzgerald |
| 2024/0062338 A1* | 2/2024 | Ford, III .......... G06V 30/19067 |
| 2024/0144204 A1* | 5/2024 | Kolavennu .......... G06V 30/414 |
| 2024/0144728 A1* | 5/2024 | Tang ..................... G06V 40/33 |

* cited by examiner

510a

510b

FIG. 6A          FIG. 6B          FIG. 6C
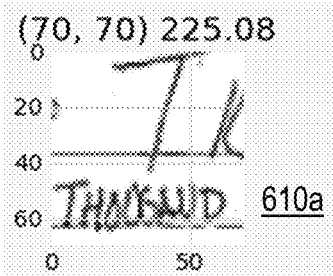
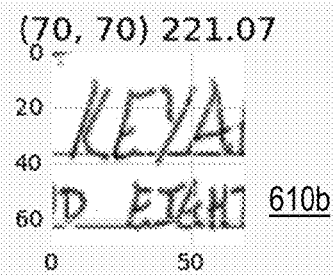
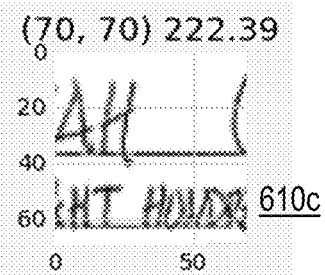
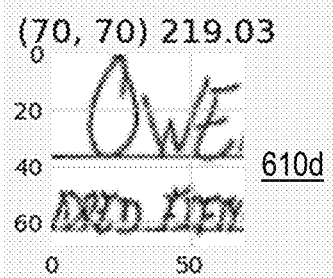
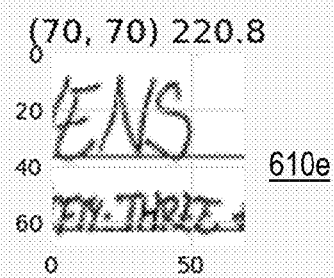
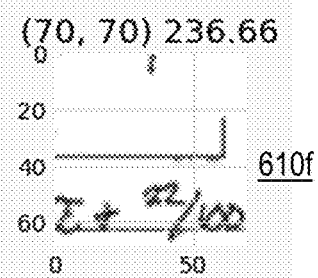
FIG. 6D          FIG. 6E          FIG. 6F APPARATUS AND METHOD FOR
ASSIGNING FINANCIAL TRANSACTION
DOCUMENT IMAGES TO RESPECTIVE
MODELS FOR FRAUD DETECTION BASED
ON DOCUMENT IMAGE
CHARACTERISTICS

FIELD

The present disclosure generally relates to image processing and, more specifically, to a technique for processing financial transaction document images and assigning processed images to appropriate respective models for fraud detection.

BACKGROUND

Frauds involving counterfeiting and/or altering financial transaction documents, such as checks, have been an ongoing problem for institutions that process and consummate the transactions on behalf of the parties of the transactions. Examples of such frauds include stolen checks being cashed with altered payees and payment amounts, such alterations are known as "check washing." "High volume mail theft incidents" involving stolen checks, for example, by "check fishing" at mail deposit repositories, have been a persistent problem resulting in "checking washing" frauds. Frauds involving financial transaction documents, such as checks, can also include forgeries, where stolen or counterfeited checks are presented with forged signatures.

SUMMARY

In view of the above-noted problems, the present disclosure provides techniques for detecting fraudulent patterns on financial transaction documents, such as checks, based separately on material alterations to the documents and on signature forgeries. Material alterations can include changes to the transactions recorded on the documents, such as the payee and payment amount on a check. Signature forgeries can include forged signatures on authentic or counterfeited documents, for example, checks that are presented for deposits or cashing. The techniques of the present disclosure are applicable to any financial firm with the need for detecting fraudulent checks among large volumes of processed checks.

In one or more exemplary embodiments of the present disclosure, strategic sampling, image processing, document type identification, and sorting processes are implemented for supplying appropriate documents to customized machine learning (ML) models for respective fraud detection tasks associated with the processed documents. The customized ML models can include respective deep neural networks (DNNs) trained on valid and invalid documents, for example, unaltered and altered checks, to review newly presented documents. In one or more exemplary implementations, respective DNNs are utilized to separately review printed and handwritten checks for material alterations. Correspondingly, a Siamese neural network (SNN) is utilized for comparing one or more signatures on a presented document against past signatures that are stored in association with the presented document, for example, an account associated with the present check.

According to one or more exemplary implementations of the present disclosure, a method, comprises: obtaining, at a processing apparatus, a plurality of document images; performing, at the processing apparatus, a material alteration detection process and a separate signature forgery detection process on the obtained plurality of document images, wherein the material alteration detection process comprises: automatically sampling, at the processing apparatus, a subset of the obtained plurality of document images based at least in part on account information indicated on the obtained plurality of document images; performing, at the processing apparatus, image pre-processing on the sampled subset of the obtained plurality of document images; determining, at the processing apparatus, a document type for each image of the sampled subset of the obtained plurality of document images, the document type indicating one of at least a handwritten document type and a printed document type; upon determining the handwritten document type for one or more document images of the sampled subset of the obtained plurality of document images, analyzing, at the processing apparatus, the one or more document images using a ML algorithm trained to detect material alterations on handwritten documents; and outputting, at the processing apparatus, a fraud probability representation for each analyzed document image, and the signature forgery detection process comprises: performing, at the processing apparatus, image pre-processing on the obtained plurality of document images; obtaining, at the processing apparatus, one or more past signatures corresponding to each of the obtained plurality of document images; performing, at the processing apparatus, signature image pre-processing on each obtained past signature; authenticating, at the processing apparatus, each signature included in the obtained plurality of document images using the obtained one or more past signatures and a ML algorithm trained to match signatures; outputting, at the processing apparatus, a similarity measure for each authenticated signature from the ML algorithm trained to match signatures; adjusting, at the processing apparatus, a threshold associated with the outputted similarity measure based on additional account information associated with each said authenticated signature; comparing, at the processing apparatus, the outputted similarity measure to the adjusted threshold; and outputting, at the processing apparatus, an alert upon determining that the outputted similarity measure fails to meet the adjusted threshold.

In one or more exemplary implementations, the sampling comprises sampling a maximum threshold number of document images for a corresponding one or more accounts associated with the obtained plurality of document images based on the account information.

In one or more exemplary implementations, the image pre-processing on the sampled subset of the obtained plurality of document images comprises increasing a contrast of the sampled subset of the obtained plurality of document images.

In one or more exemplary implementations, the determining comprises comparing a pixel intensity for each said image to a pixel intensity threshold.

In one or more exemplary implementations, the handwritten document type is determined when the pixel intensity is above the pixel intensity threshold.

In one or more exemplary implementations, the printed document type is determined when the pixel intensity is at or below the pixel intensity threshold and the method further comprises, upon determining the printed document type for one or more document images of the sampled subset of the obtained plurality of document images, analyzing the one or more document images using a ML algorithm trained to detect material alterations on printed documents.

In one or more exemplary implementations, one or more of the ML algorithm trained to detect material alterations on handwritten documents and the ML algorithm trained to detect material alterations on printed documents are trained by under-sampling "non-fraud" documents.

In one or more exemplary implementations, the under-sampling corresponds to a process of the sampling of the subset of the obtained plurality of document images.

In one or more exemplary implementations, the fraud probability representation comprises a heatmap that indicates one or more locations associated with a heightened fraud probability.

In one or more exemplary implementations, the additional account information comprises a margin of error among a plurality of past signatures for an account associated with the outputted similarity measure, and the adjusting comprises adjusting the threshold according to the margin of error.

According to one or more exemplary implementations of the present disclosure, an apparatus, comprises: a processor; and one or more memory storage devices operatively connected to the processor and having stored thereon machine-readable instructions that, when executed, cause the processor to: obtain a plurality of document images; perform a material alteration detection process and a separate signature forgery detection process on the obtained plurality of document images, wherein the one or more memory storage devices have stored thereon machine-readable instructions for the material alteration detection process that, when executed, cause the processor to: automatically sample a subset of the obtained plurality of document images based at least in part on account information indicated on the obtained plurality of document images; perform image pre-processing on the sampled subset of the obtained plurality of document images; determine a document type for each image of the sampled subset of the obtained plurality of document images, the document type indicating one of at least a handwritten document type and a printed document type; upon determining the handwritten document type for one or more document images of the sampled subset of the obtained plurality of document images, analyze the one or more document images using a ML algorithm trained to detect material alterations on handwritten documents; and output a fraud probability representation for each analyzed document image, and the one or more memory storage devices have stored thereon machine-readable instructions for the signature forgery detection process that, when executed, cause the processor to: perform image pre-processing on the obtained plurality of document images; obtain one or more past signatures corresponding to each of the obtained plurality of document images; perform signature image pre-processing on each obtained past signature; authenticate each signature included in the obtained plurality of document images using the obtained one or more past signatures and a ML algorithm trained to match signatures; output a similarity measure for each authenticated signature from the ML algorithm trained to match signatures; adjust a threshold associated with the outputted similarity measure based on additional account information associated with each said authenticated signature; compare the outputted similarity measure to the adjusted threshold; and output an alert upon determining that the outputted similarity measure fails to meet the adjusted threshold.

In one or more exemplary implementations, the sampling comprises sampling a maximum threshold number of document images for a corresponding one or more accounts associated with the obtained plurality of document images based on the account information.

In one or more exemplary implementations, the image pre-processing on the sampled subset of the obtained plurality of document images comprises increasing a contrast of the sampled subset of the obtained plurality of document images.

In one or more exemplary implementations, the determining comprises comparing a pixel intensity for each said image to a pixel intensity threshold.

In one or more exemplary implementations, the handwritten document type is determined when the pixel intensity is above the pixel intensity threshold.

In one or more exemplary implementations, the printed document type is determined when the pixel intensity is at or below the pixel intensity threshold and the one or more memory storage devices have further stored thereon machine-readable instructions for the material alteration detection process that, when executed, cause the processor to: upon determining the printed document type for one or more document images of the sampled subset of the obtained plurality of document images, analyze the one or more document images using a ML algorithm trained to detect material alterations on printed documents.

In one or more exemplary implementations, one or more of the ML algorithm trained to detect material alterations on handwritten documents and the ML algorithm trained to detect material alterations on printed documents are trained by under-sampling "non-fraud" documents.

In one or more exemplary implementations, the under-sampling corresponds to a process of the sampling of the subset of the obtained plurality of document images.

In one or more exemplary implementations, the fraud probability representation comprises a heatmap that indicates one or more locations associated with a heightened fraud probability.

In one or more exemplary implementations, the additional account information comprises a margin of error among a plurality of past signatures for an account associated with the outputted similarity measure, and the adjusting comprises the adjusting comprises adjusting the threshold according to the margin of error.

BRIEF DESCRIPTION OF THE DRAWINGS

Various example implementations of this disclosure will be described in detail, with reference to the following figures, wherein:

FIG. 6A, FIG. 6B, FIG. 6C, FIG. 6D, FIG. 6E, and FIG. 6F illustrate sample check image portions after pre-processing according to one or more exemplary embodiments of the present disclosure.

DETAILED DESCRIPTION

To address the problem of document or check fraud, the present disclosure provides a system, apparatus, and method for processing volumes of documents or checks so as to perform respective fraud detection tasks using customized models.

The following example implementations are described based on check image processing so that fraud detection tasks can be performed using respective customized ML models, features of which can be incorporated into other types of document fraud detection and identification without departing from the spirit and the scope of the disclosure.

Figure 1:
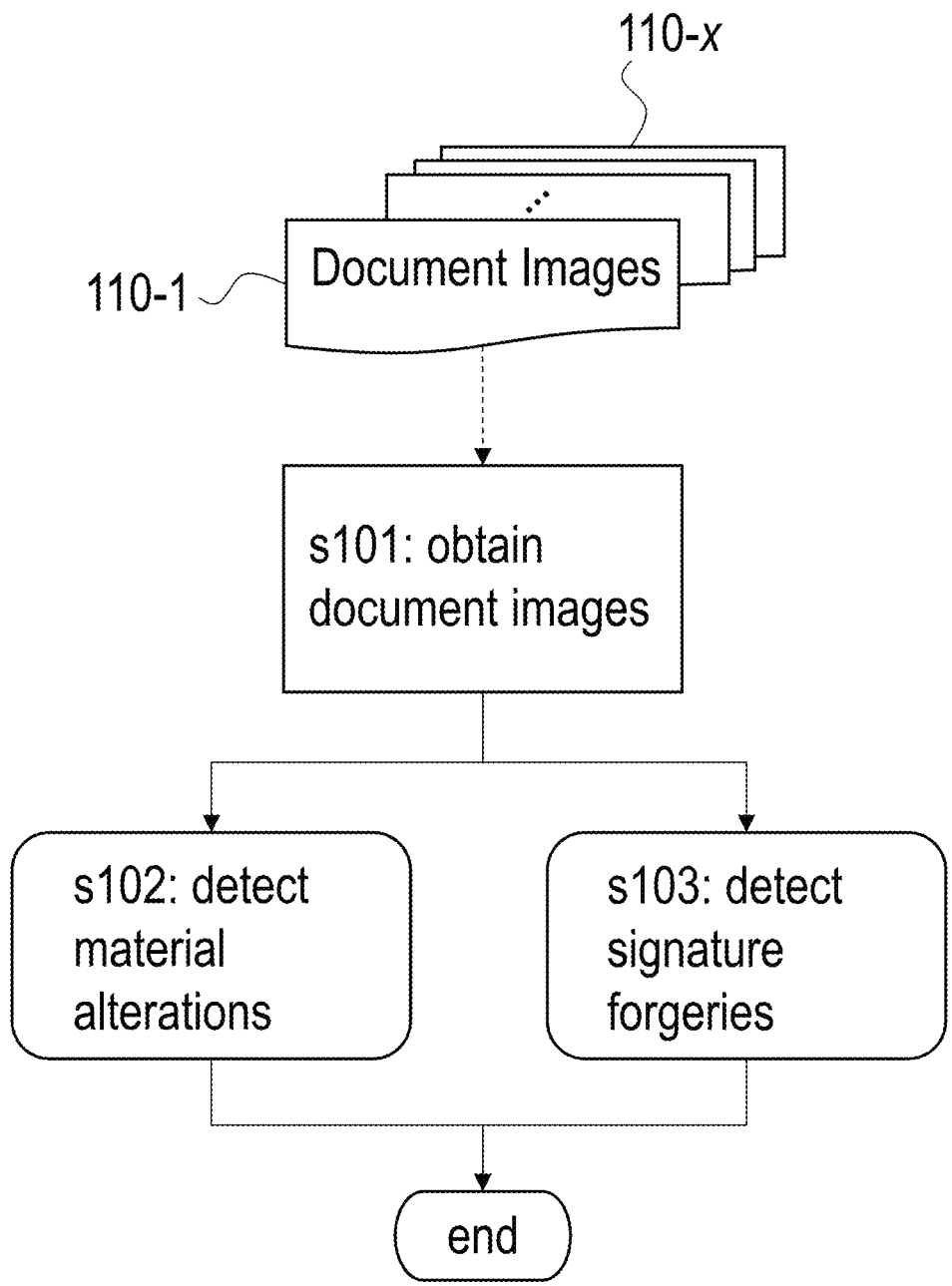
FIG. 1 is a flow diagram of a document fraud detection process according to one or more exemplary implementations of the present disclosure.

FIG. 1 is a flow diagram of a document fraud detection process 100 according to one or more exemplary implementations of the present disclosure.

As shown in FIG. 1, process 100 initiates with step s101 of obtaining a plurality of document images 110-1 ... 110-$x$ ($x$>1). In one or more exemplary implementations, document images 110-1 ... 110-$x$ are images of checks that are received periodically for clearance against payor accounts by a financial institution. The images can be collected, for example, via a network from an end user device (e.g., from device(s) 440 via network 430 in FIG. 4), an automated teller machine (ATM) (e.g., 440-2 in FIG. 4), a check cashing vendor (e.g., 450-$z$ in FIG. 4), or the like, and forwarded to the financial institution for clearance. In one or more exemplary embodiments, the check images 110 are collected at a data repository, for example, at information system 420 in FIG. 4, and periodically retrieved for fraud detection, for example, at processing apparatus 401 in FIG. 4. Process 100 concludes with separately detecting for material alterations, at step s102, and detecting for signature forgeries, at step s103, in the obtained images 110. Advantageously, the respective types of fraud can be detected with higher accuracy and efficiency using customized models and appropriate image processing.

Figure 2A:
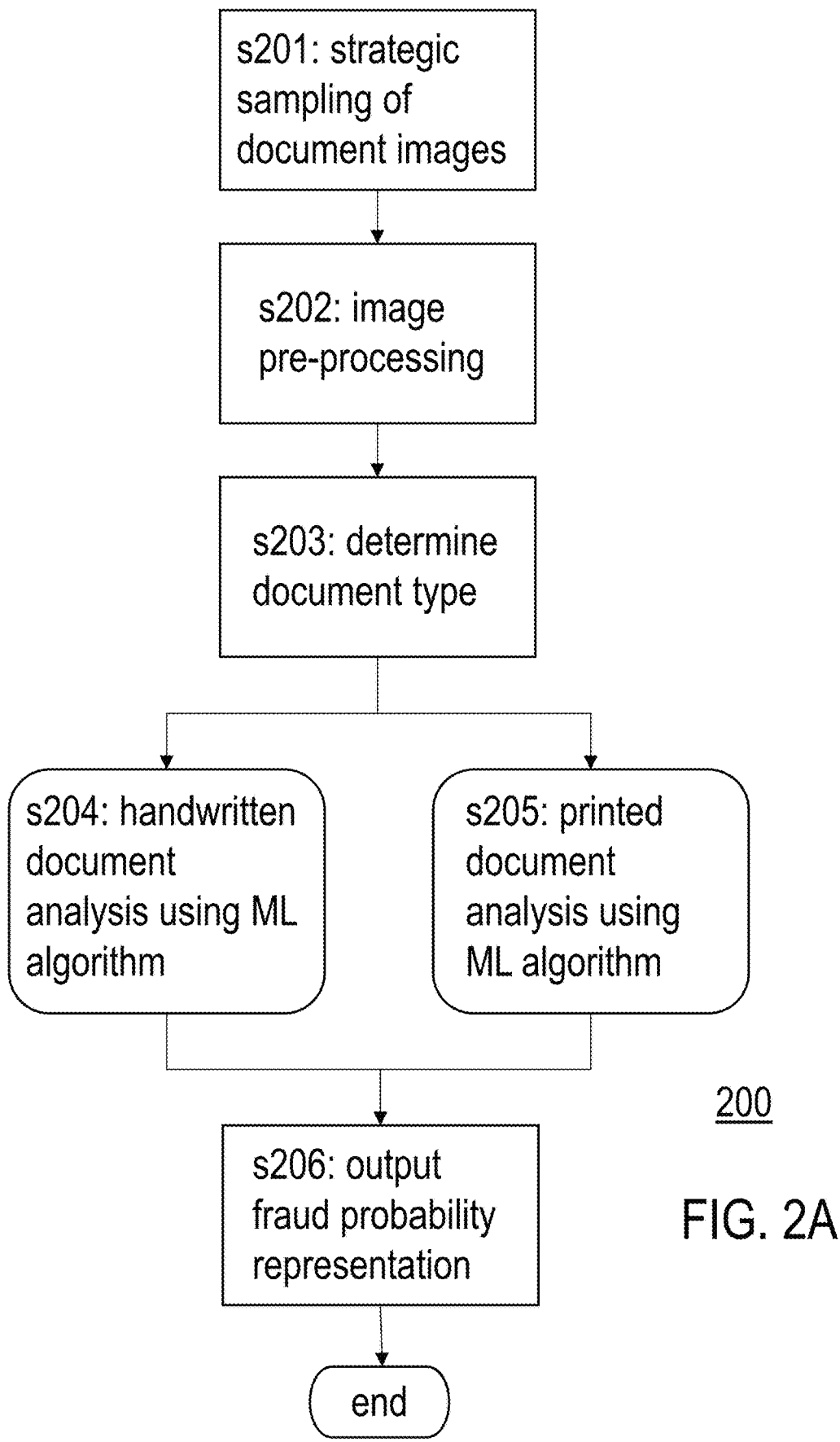
FIG. 2A is a flow diagram of a material alteration detection process of FIG. 1 in accordance with one or more exemplary implementations of the present disclosure.

FIG. 2A is a flow diagram of a material alteration detection process 200 corresponding to step s102 of process 100 in accordance with one or more exemplary implementations of the present disclosure.

Process 200 initiates with step s201 of a processing apparatus (401 in FIG. 4) of strategic sampling a subset of the document images (e.g., check images) included in the obtained images 110. In one or more exemplary implementations, each account with at least one check included in the obtained images 110 is assigned a maximum and/or minimum threshold for the number of checks to be sampled for fraud over a predetermined period of time. Accordingly, the strategic sampling of accounts for variations in handwriting can maintain effectiveness, for example, while reducing the load on the fraud detection process compared to sampling every check included in obtained images 110. In one or more exemplary embodiments, the processing apparatus (401 in FIG. 4) reads the account numbers at the bottom portions of the obtained images 110, for example, using computer vision (CV), optical character recognition (OCR), or the like, to count the number of checks that are included for each identified account among the obtained images 110. Accordingly, accounts with more checks than a maximum threshold can be automatically sampled up to the maximum threshold number of checks for a predetermined sampling period. For example, the processing apparatus (401 in FIG. 4) can perform processes 100 and 200 weekly, monthly, quarterly, annually, or the like, and maximum thresholds can be set to 1, 3, 9, 36, respectively. In certain embodiments, different periods and/or thresholds can be set. Additionally, automatic sampling can be conducted according to account numbers on the obtained images 110 up to respective maximum thresholds. As an example, process 200 can continually sample document images 110 for respective accounts and proceed to next steps for one or more particular accounts upon reaching a threshold number of images sampled for those one or more accounts. In certain embodiments, the sampling process can incorporate one or more pseudo-random or stochastic processes for selecting the images 110 for sampling and processing.

Figure 4:
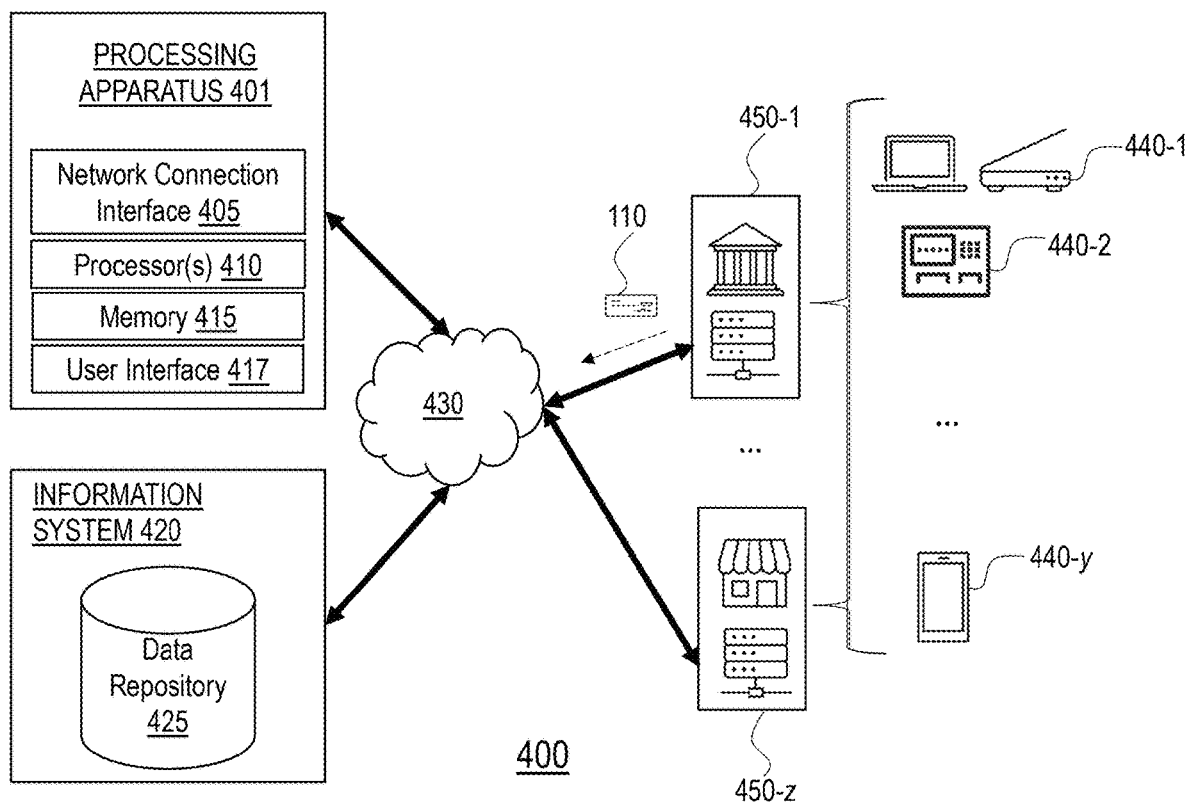
FIG. 4 is a schematic diagram of a system for implementing the processes of FIGS. 1-3 according to one or more exemplary embodiments of the present disclosure.

Next, at step s202, the subset of images sampled from the obtained images 110 undergo pre-processing at the processing apparatus (401 in FIG. 4).

Figure 2B:
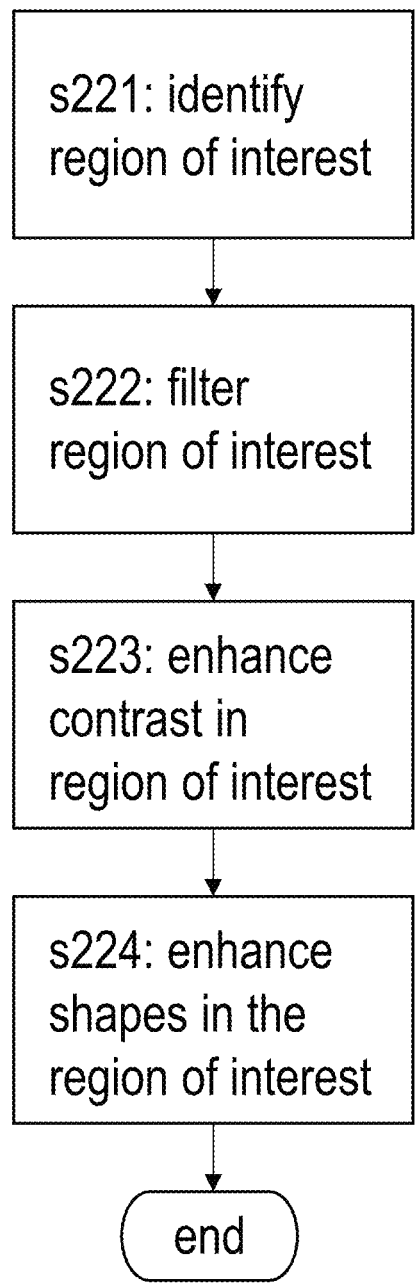
FIG. 2B is a flow diagram of an image pre-processing process of FIG. 2A in accordance with one or more exemplary implementations of the present disclosure.

FIG. 2B is a flow diagram of a process 212 corresponding to step s202 of process 200 in accordance with one or more exemplary implementations of the present disclosure.

As illustrated in FIG. 2B, process 212 initiates with step s221, where the processing apparatus (401 in FIG. 4) identifies one or more regions of interest in a sampled document image (e.g., check image). For a check image, the region(s) of interest contains the payee name and amount (for example, areas 515, 520$a$ and 520$b$ in FIG. 5B). Next, at step 222, the processing apparatus (401 in FIG. 4) filters the sampled document image. In one or more exemplary implementations, a localized filter, such as a Gaussian or median filter, is employed at and/or around the region(s) of interest to smooth the background. This localized filtering helps in reducing noise and sharpening the boundaries of, for example, the payee name and amount. Next, at step 223, processing apparatus (401 in FIG. 4) applies a contrast enhancement technique. In certain embodiments, histogram equalization or adaptive histogram equalization, which dynamically adjust pixel intensities, can be used to amplify text contrast, for example, the contrast for the text in the region(s) of interest (e.g., payee name and amount). Accordingly, steps s222 and s223 can be characterized as a two-step enhancement process that increases pixel contrast and highlights the region(s) of interest. In certain embodiments, different numbers and/or kinds of processes can be used to enhance pixel contrast and to highlight content in the region(s) of interest. Finally, at step s224, processing apparatus (401 in FIG. 4) enhances shapes (e.g., text) in the region(s) of interest. In one or more exemplary implementations, a post-processing technique, such as morphological operations, is employed. For example, erosion and dilation operations help in fine-tuning the text's edges and eliminating noise, ensuring the highlighted payee name and amount are crisply delineated within a sampled check image. Accordingly, the image pre-processing of step s202, and process 212, effectively draws attention to the region(s) of interest (for example, areas 515, 520$a$ and 520$b$ in FIG. 5B), thereby facilitating improved classification by a neural network algorithm for fraud detection.

In certain implementations, the pre-processing can include one or more of grayscaling, thresholding, cropping, deskewing, despeckling, line removal, dilation, pixel grouping, filtering, region extraction, contrast enhancement, OCR, to name a few. U.S. Pat. No. 11,106,891 (the '891 Patent), filed on Sep. 9, 2019 by the Applicant and issued on Aug. 31, 2021, describes an automated process for extracting handwritten signatures that includes image pre-processing. U.S. Pat. No. 11,961,094 (the '094 Patent), filed on Nov. 15, 2020 by the Applicant and issued on Apr. 16, 2024, describes an automated fraud detection process using handwriting clustering, which also includes image pre-processing for extracting the handwriting to be clustered. The '891 Patent and the '094 Patent, which are hereby incorporated by reference in their entireties, include description of examples for image pre-processing that are suitable for document authentication according to one or more exemplary embodiments of the present disclosure. According to one or more exemplary embodiments of the present disclosure, the image pre-processing at step s202 comprises increasing the contrast of each of the subset of images sampled from the obtained images 110.

Referring back to FIG. 2A, process 200 next proceeds to step s203, where the processing apparatus (401 in FIG. 4) determines a type of document for each sampled and processed image 110. In one or more exemplary implementations, the processing apparatus (401 in FIG. 4) determines whether each sampled and processed image 110 is that of a handwritten check (handwritten document type) or a printed check (printed document type) by determining an aggregate or average pixel intensity of each sampled and processed image 110. It has been determined that handwritten checks incorporate denser written pixels than printed pixels on printed checks. Accordingly, in one or more exemplary embodiments, step s203 includes comparing a pixel intensity parameter, for example, with a 0-255 range (0 indicating maximum pixel content intensity such as a darker or black shade, and 255 indicating minimum pixel content intensity such as a lighter or white shade), for each sampled and processed image 110 to a pixel intensity threshold (e.g., 230). Upon determining that a pixel intensity for a sampled and processed image 110 is at or below the threshold (e.g., a handwritten document type), the processing apparatus (401 in FIG. 4) proceeds to step s204 to authenticate a handwritten document (e.g., check) corresponding to the sampled and processed image 110. For example, when a mean pixel intensity of a sampled and processed image 110 ranges from 0-230, it is labelled as an image for a handwritten check. Upon determining that a pixel intensity for a sampled processed image 110 is above the threshold (e.g., a printed document type), the processing apparatus (401 in FIG. 4) proceeds to step s204 to authenticate a printed document (e.g., check) corresponding to the sampled and processed image 110. For example, when a mean pixel intensity of a sampled and processed image 110 ranges from 231-255, it is labelled as a printed check.

At step s204, the processing apparatus (401 in FIG. 4) analyzes handwritten document, e.g., check, and determines whether there has been material alteration to it based on its sampled and processed image 110. According to one or more exemplary implementations, step s204 is conducted using a supervised machine learning (ML) algorithm trained on labeled data comprising images of "fraud" and "non-fraud" handwritten checks, where "fraud" images are of past verified examples of handwritten checks containing one or more material alterations and "non-fraud" images are past verified examples of handwritten checks that do not contain any material alterations. The ML algorithm can be a deep learning (DL) algorithm, such as a convolutional neural network (CNN), and trained as a classifier to differentiate sampled and processed images 110 identified as those of handwritten checks at step s203 between "fraud" and "non-fraud" handwritten checks. In certain embodiments, "non-fraud" handwritten checks can be under-sampled for training the ML algorithm, for example, according to the strategic sampling process of step s201. Advantageously, the ML algorithm is customized to handwritten documents and is trained to recognize material alterations, for example, to the payee and the payment amount, that are unique to handwritten checks. In one or more exemplary implementations, the ML algorithm for handwritten checks is adapted to indicate one or more fraud probabilities ($0 \leq fp_{hw} \leq 1$) at one or more corresponding locations on an image (110) of a handwritten check and a fraud probability $f_{p_{hw}} > 0.85$ (or 0.6 or 0.7) indicates a probable fraud in connection with a processed handwritten document. In certain embodiments, the ML algorithm used in step s204 can incorporate one or more unsupervised ML algorithms.

At step s205, the processing apparatus (401 in FIG. 4) analyzes a printed document, e.g., check, and determines whether there has been material alteration to it based on its sampled and processed image 110. According to one or more exemplary implementations, step s205 is conducted using a supervised ML algorithm trained on labeled data comprising images of "fraud" and "non-fraud" printed checks, where "fraud" images are of past verified examples of printed checks containing one or more material alterations and "non-fraud" images are past verified examples of printed checks that do not contain any material alterations. The ML algorithm can be a DL algorithm, such as a CNN, and trained as a classifier to differentiate sampled and processed images 110 identified as those of printed checks at step s203 between "fraud" and "non-fraud" printed checks. In certain embodiments, "non-fraud" printed checks can be under-sampled for training the ML algorithm, for example, according to the strategic sampling process of step s201. Advantageously, the ML algorithm is customized to printed documents and is trained to recognize material alterations, for example, to the payee and the payment amount, that are unique to printed checks. In one or more exemplary implementations, the ML algorithm for printed checks is adapted to indicate one or more fraud probabilities ($0 \leq fp_p \leq 1$) at one or more corresponding locations on an image (110) of a printed check and a fraud probability $fp_p > 0.85$ (or 0.6 or 0.7) indicates a probable fraud in connection with a processed printed document. In certain embodiments, the ML algorithm used in step s205 can incorporate one or more unsupervised ML algorithms.

Based on the determinations at steps s204 and s205 using respective ML algorithms, the processing apparatus (401 in FIG. 4) outputs a fraud probability representation for each sampled and processed image 110 at step s206. According to one or more exemplary embodiments of the present disclosure, the fraud probability representation is in the form of a heatmap (see FIG. 7) that indicates one or more relative fraud probabilities ($fp_{hw}$ and/or $fp_p$) in connection with one or more locations of an analyzed image 110. According to one or more exemplary embodiments, a sampled and processed image 110 is marked as a "fraud" image when a fraud probability (($fp_{hw}$ or $fp_p$) is above a threshold, for example, $fp_{hw}$ or $fp_p > 0.85$ (or 0.6 or 0.7). Advantageously, the heatmap provides a readily viewable explanation on one or more areas of potential fraud on a sampled and processed image 110, which significantly reduces investigation time by clearly highlighting suspicious areas. Additionally, the heatmap provides for straightforward confirmations of detected frauds based on the locations of the detected frauds. For example, a high probability of fraud detected at a location corresponding to common frauds, such as the payee and/or the payment amount, can be readily confirmed by viewing a heatmap. Correspondingly, a high probability of fraud detected at another location can indicate an error rather than a fraud, for example, at a date location, a memo location, or the like. Thus, such heatmaps can thereby be confirmed by a human operator and the corresponding images 110 can be appropriately labeled as "fraud" or "non-fraud" for training and/or adjusting the ML algorithm(s) used at step s204 and/or s205. For confirmed "fraud" image(s), the processing apparatus (401 in FIG. 4) can output an instruction message (not shown) to another computing apparatus, for example, a transaction clearance apparatus (e.g., computing system(s) of entity(ies) 450 in FIG. 4), to initiate fraud remedial action(s) for the check(s) associated with the "fraud" image(s) according to one or more exemplary implementations of the present disclosure.

Figure 3:
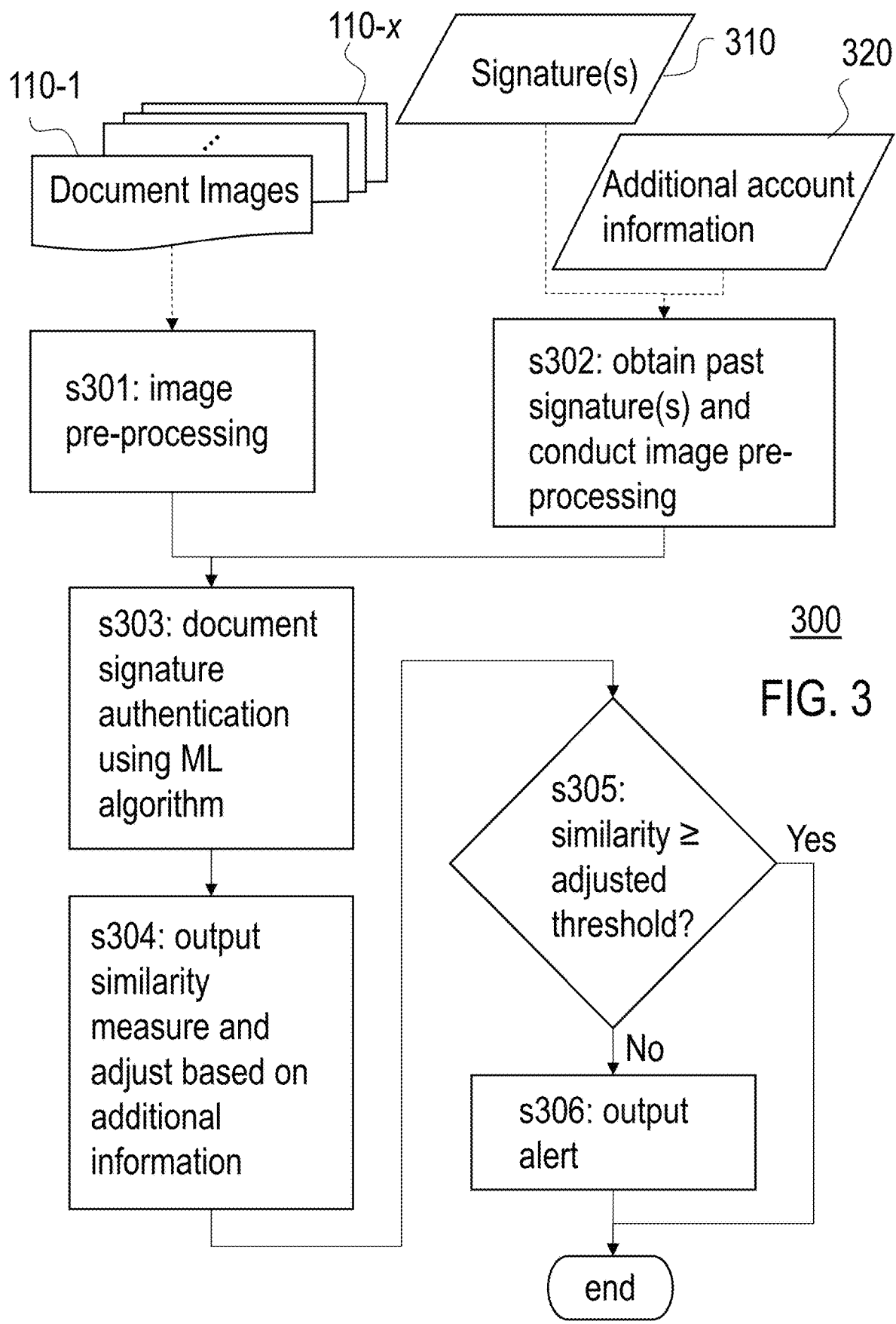
FIG. 3 is a flow diagram of a signature forgery detection process of FIG. 1 in accordance with one or more exemplary implementations of the present disclosure.

FIG. 3 is a flow diagram of a signature forgery detection process 300 corresponding to step s103 of process 100 in accordance with one or more exemplary implementations of the present disclosure.

As shown in FIG. 3, process 300 initiates with step s301 of the processing apparatus (401 in FIG. 4) pre-processing the obtained document images 110-1 . . . 110-x. In one or more exemplary implementations, the pre-processing corresponds to image pre-processing at step s202 of process 200. In certain embodiments, the pre-processing can include one or more of grayscaling, thresholding, cropping, deskewing, despeckling, line removal, dilation, pixel grouping, filtering, region extraction, contrast enhancement, optical character recognition (OCR), to name a few. The '891 Patent and the '094 Patent include description of examples for image pre-processing that are suitable for signature authentication according to one or more exemplary embodiments of the present disclosure. In one or more exemplary implementations, a signature portion of each of the obtained document images 110-1 . . . 110-x is targeted and/or extracted for analysis.

Alongside step s301, the processing apparatus (401 in FIG. 4), at step s302, obtains one or more past signatures 310 corresponding to the obtained document images 110-1 . . . 110-x and conducts image pre-processing on the obtained past signature(s) in correspondence with the image pre-processing conducted at step s301. In one or more exemplary embodiments, the past signature(s) 310 is obtained from a database (e.g., data repository 425 in FIG. 4) based on an account associated with each of the obtained document images 110-1 . . . 110-x. In correspondence with the past signatures, the processing apparatus (401 in FIG. 4) also obtains additional account information 320 for providing context to the signature authentication. Additional account information 320 includes information on possible circumstances for adjusting the similarity measure. In one or more exemplary implementations of the present disclosure, additional account information 320 includes indicators for joint accounts, accounts with powers of attorney in place, signature meta data, to name a few. Joint accounts include valid signatures for more than one account holder and accounts with power(s) of attorney include valid signatures for one or more persons with a power of attorney for the account. Accordingly, such accounts can warrant additional signature verifications to ensure security of such accounts. In certain embodiments, process 300, or steps s303-s306, can be repeated or concurrently executed for multiple signature authentications for such accounts based on additional past signatures that are saved and associated with the accounts, for example, those of a joint holder or a holder of a power of attorney for an account. Accordingly, an aggregate similarity measure for an account based on the repeated or concurrent executions of process 300 for the multiple signatures can be used to authenticate the multiple signatures associated with the account.

Next, at step s303, the processing apparatus (401 in FIG. 4) verifies one or more signatures on each of the obtained document images 110-1 . . . 110-x using a ML algorithm based on one or more corresponding past signatures 310 associated with the account of each of the images 110 obtained and pre-processed at step s302. According to one or more exemplary embodiments, the ML algorithm incorporates a Siamese neural network adapted to compare the processed output at step s301 representing one or more signatures on an obtained document image 110 with the processed output at step s302 representing one or more past signatures for the account associated with the obtained document image 110. In certain embodiments, other ML algorithms, such as a recurrent neural network (RNN) or the like, can be used.

As noted before, past signatures 310 can include sets of one or more signatures for joint account holders and/or holders of a power of attorney based on additional account information 320. Accordingly, the processing apparatus (401 in FIG. 4) can repeatedly and/or concurrently execute the ML algorithm at step s303 for each set of past signatures 310 associated with an account, including sets for joint account holders and/or holders of a power of attorney.

As shown in FIG. 3, the processing apparatus (401 in FIG. 4) proceeds next to step s304, where a similarity measure ($0 \leq sm \leq 1$) is outputted from the ML algorithm of step s303. According to one or more exemplary embodiments, the similarity measure (sm) is a continuous number that indicates a percentage similarity between the compared signatures at step s303. In one or more exemplary embodiments, the threshold value for sm=0.8 at or above which indicates authenticity of one or more signatures on an obtained document image 110 against one or more corresponding past signatures 310 associated with a corresponding account.

Signature meta data, which can be associated with the past signature(s) retrieved at step s302, can be used as additional account information 320 to adjust the similarity measure at step s304. In one or more exemplary embodiments, the signature meta data incorporates a margin of error among plural past valid signatures for an account associated with a similarity measure, for example, signatures for 2-5 past verified checks and/or account master signature(s). The margin of error is determined by a processing apparatus (401 in FIG. 4), for example, using a CV algorithm that determines one or more difference vectors among plural input signatures. In certain embodiments, a ML algorithm can also be used for determining a margin of error among valid signatures of an account. Accordingly, the similarity measure can be adjusted at step s304 according to a margin of error among valid past signatures for an account associated with the similarity measure, which is incorporated in the additional account information 320. For example, the sm threshold can be adjusted based on a margin of error, where the sm threshold becomes lower when the margin of error is high for an account and/or relatively higher when a margin of error is low for an account. The margin of error varies for each individual and each account because the level of variation in signatures differs from person to person. As such, a margin of error can be assigned to each valid individual, for example, a joint account holder and/or a holder of a power of attorney in each account. In one or more exemplary implementations, an acceptable margin of error ranges from about 0.1% to about 12% among valid signatures of an account.

Next, at step s305, processing apparatus (401 in FIG. 4) determines whether a similarity measure is at or above a validity threshold, for example, sm≥0.8. For accounts with multiple joint holders and/or power(s) of attorney, processing apparatus (401 in FIG. 4) makes the threshold determination for the highest similarity measure outputted at step s304 from among the sets of past signatures 310 to which the one or more signatures from document images 110 are compared at step s303. As noted before, past signatures 310 for each individual in an account can be assigned a margin of error (in additional account information 320) and, accordingly, the threshold can be adjusted based on an individual's margin of error. For example, a 0.8 threshold can be adjusted down to a 0.72 for an individual with past signatures 310 that have a margin of error of 10%, or to a 0.775 for an individual with past signatures 310 that have a margin of error of 2.5%, or to a 0.79 for an individual with past signatures 310 that have a margin of error of 0.7%, to name a few.

Upon determining that a similarity measure outputted at step s304 is at or above an adjusted threshold ("Yes"), the processing apparatus (401 in FIG. 4) determines that the corresponding signature from the obtained document image 110 is a valid signature and process 300 concludes for that signature and/or the associated document.

Upon determining that a similarity measure outputted at step s304 is below an adjusted threshold ("No"), the processing apparatus (401 in FIG. 4) proceeds to step s306 and outputs an alert indicating a potentially fraudulent signature. In certain embodiments, the processing apparatus (401 in FIG. 4) can output an instruction message (not shown) to another computing apparatus, for example, a transaction clearance apparatus (e.g., computing system(s) of entity (ies) 450 in FIG. 4), to initiate fraud remedial actions for a document (e.g., check) associated with the document image 110 containing the detected signature that is below the similarity measure threshold.

FIG. 4 is a schematic diagram of a system for implementing a document authentication technique according to one or more exemplary embodiments of the present disclosure.

As shown in FIG. 4, a processing apparatus 401 and an information system 420 are communicatively connected to each other via a network 430, which processing apparatus 401 and/or information system 420 can be communicatively connected to one or more devices 440-1 . . . 440-y (y≥1) for receiving check image(s) 110-1 . . . 110-x via respective one or more computer systems of entity (ies) 450-1 . . . 450-z (z≥1).

The network 430 can be the Internet, an intranet network, a local area network, other wireless or other hardwired connection or connections, or a combination of one or more thereof, by which the aforementioned entities can communicate. Communications systems for facilitating network 430 can include hardware (e.g., hardware for wired and/or wireless connections) and/or software, and the communications interface hardware and/or software, which can be used to communicate over wired and/or wireless connections, can include Ethernet interfaces (e.g., supporting a TCP/IP stack), X.25 interfaces, T1 interfaces, and/or antennas, to name a few. Computer systems can communicate with other computer systems or devices directly and/or indirectly, e.g., through a data network, such as the Internet, a telephone network, a mobile broadband network (such as a cellular data network), a mesh network, Wi-Fi, WAP, LAN, and/or WAN, to name a few. For example, network(s) 430 can be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), which are some of the various types of protocols that can be used to facilitate communications between processing apparatus 401, information system 420, and computing system(s) of entities 450-1 . . . 450-z. According to one or more exemplary embodiments of the present disclosure, network 430 is comprised of switches (not shown), routers (not shown), and other computing devices (not shown) for facilitating communications and data exchanges among processing apparatus 401, information system 420, computing system(s) of entity (ies) 450-1 . . . 450-z, and device(s) 440-1 . . . 440-y, while conforming to the above-described connections and protocols as understood by those of ordinary skill in the art.

Processing apparatus 401 manages the training and deployment processes for the document authentication of the present disclosure. In one or more exemplary implementations, processing apparatus 401 embodies one or more of an application server, a network management apparatus, a data management system, and the like. In certain embodiments, the document authentication process of the present disclosure is applicable to any data management system incorporated in processing apparatus 401 for managing any document authentication tasks. It should be further understood that while the various computing devices and machines referenced herein, including but not limited to processing apparatus 401, information system 420, computing system(s) of entity (ies) 450, and device(s) 440, are referred to herein as individual/single devices and/or machines, the referenced devices and machines, and their associated and/or accompanying operations, features, and/or functionalities can be combined or arranged or otherwise employed across any number of devices and/or machines, such as over a network connection or wired connection, as is known to those of skill in the art. Correspondingly, functionality for any multiple units, for example, processing apparatus 401 and information system 420, can be combined and incorporated to a single apparatus without departing from the spirit and scope of the present disclosure.

In some embodiments, device(s) 440 and computing system(s) of entity (ies) 450 can communicate with one another via a web browser using HTTP. Various additional communication protocols can be used to facilitate communications via network 430, include the following non-exhaustive list, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, FTP, RTP, RTSP, and/or SSH.

Correspondingly, as shown in FIG. 4, processing apparatus 401 incorporates communications circuitry ("Network Connection Interface") 405, one or more processor(s) 410, and a memory 415.

Network connection interface 405 can include any circuitry allowing or enabling one or more components of processing apparatus 401 to communicate with one or more additional devices, servers, and/or systems over network 430—for example, one or more of information system 420, computing system(s) of entity (ies) 450, and device(s) 440. Network connection interface 405 can use any of the previously mentioned exemplary communications protocols. According to one or more exemplary embodiments, network connection interface 405 comprises one or more universal serial bus ("USB") ports, one or more Ethernet or broadband ports, and/or any other type of hardwire access port to communicate with network 430 and, accordingly, information system 420, computing system(s) of entity (ies) 450, and device(s) 440.

One or more processor(s) 410 can include any suitable processing circuitry capable of controlling operations and functionality of processing apparatus 401, as well as facilitating communications between various components within processing apparatus 401. In some embodiments, processor(s) 410 can include a central processing unit ("CPU"), a graphic processing unit ("GPU"), one or more microprocessors, a digital signal processor, or any other type of processor, or any combination thereof. In some embodiments, the functionality of processor(s) 410 can be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 410 can include its own local memory, which can store program systems, program data, and/or one or more operating systems.

Memory 415 can include one or more types of storage mediums such as any volatile or non-volatile memory, or any removable or non-removable memory implemented in any suitable manner to store data for processing apparatus 401. For example, information can be stored using computer-readable instructions, data structures, and/or program systems. Various types of storage/memory can include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 9301 can be implemented as computer-readable storage media ("CRSM"), which can be any available physical media accessible by processor(s) 410 to execute one or more instructions stored within memory 415. According to one or more exemplary embodiments, one or more applications corresponding to the document authentication and associated processing, including processes 100, 200, and 300 illustrated in FIGS. 1-3, are executed by processor(s) 410. In embodiments, the instructions and data associated with these processes can be stored in memory 415 and/or at information system 420.

According to one or more exemplary implementations of the present disclosure, processing apparatus 401 is in communication with information system 420 via direct connection and/or via network 430. As illustrated in FIG. 4, information system 420 maintains data repository 425, which can incorporate one or more database(s) embodied in servers and corresponding storage media for storing documentary, transactional, and associated data for an entity-such as a financial services firm or one or more departments thereof. Correspondingly, in embodiments, processing apparatus 401, information system 420, and at least a part of network 430 can be maintained by and/or associated with the entity. According to one or more exemplary embodiments, the data stored at data repository 425 includes, but is not limited to, transactional documents, account information, images of handwritten and printed checks, signature images, labelled ML data, document categorization (type) data, fraud probability data, fraud probability representation data, similarity measure data, and uncategorized documents.

Exemplary storage media for the data storage of data repository 425 correspond to those described above with respect to memory 415, which will not be repeated here. In embodiments, information system 420 can incorporate a database management system (DBMS) and be comprised of one or more database servers that support Oracle SQL, NoSQL, NewSQL, PostgreSQL, MySQL, Microsoft SQL Server, Sybase ASE, SAP HANA, DB2, and the like. Information system 420 incorporates a network connection interface (not shown) for communications with network 430 and exemplary implements of which can include those described above with respect to network connection interface 405, which will not be repeated here.

In certain embodiments, processing apparatus 401 can be any computing device and/or data processing apparatus capable of embodying the systems and/or methods described herein and can include any suitable type of electronic device including, but not limited to, desktop computers, mobile computers (e.g., laptops, ultrabooks), mobile phones, portable computing devices, such as smart phones, tablets, personal display devices, personal digital assistants ("PDAs"), virtual reality devices, wearable devices (e.g., watches), to name a few, with network (e.g., Internet) access that is uniquely identifiable by Internet Protocol (IP) addresses, Internet cookies, Media Access Control (MAC) identifiers, or online personal accounts of individual users (e.g., entity account of a user), either directly or through another personal device.

User interface 417 is operatively connected to processor(s) 410 and can include one or more input or output device(s), such as switch(es), button(s), key(s), a touch screen, a display, microphone, camera(s), sensor(s), etc. as would be understood in the art of electronic computing devices. Thus, the fraud probability representation of step s206 in process 200 can be outputted to user interface 417 according to one or more exemplary implementations of the present disclosure.

In certain embodiments, processing apparatus 401 and/or information system 420 can implement an application server adapted to host one or more applications that are accessible and executable over network 430 by one or more users (user #1 . . . user #z) at respective user devices (not shown). In such embodiments, executable portions of applications maintained at the application server can be offloaded to the user device (not shown).

As illustrated in FIG. 4, each device 440-1 . . . 440-$y$ is associated with a respective entity 450-1 . . . 450-$z$ ($z \geq 1$), such as a banking institution, a check cashing service, or the like. Device(s) 440 can be a computer with a scanner, an Automatic Teller Machine (ATM), a mobile device with a camera, or the like, for capturing one or more images of a check to be cashed or deposited. As an example, an application associated with an entity 450 can be executed at a device 440 for depositing a check into an account maintained at entity 450. Correspondingly, entity (ies) 450 can comprise computing systems for receiving the captured image(s) and processing the associated transaction with the issuing entity of the check. For checks that are issued by an institution associated with processing apparatus 401 and information system 420, the image(s) 110 can be transmitted from entity (ies) 450 via network 430 to processing apparatus 401 and/or information system 420. The image(s) 110 can be authenticated according to processes 100, 200, and/or 300 described above with reference to FIGS. 1-3 and can also be incorporated to training data for training the ML algorithm of step s204, s205, and/or s303.

EXAMPLES

Figure 5A:
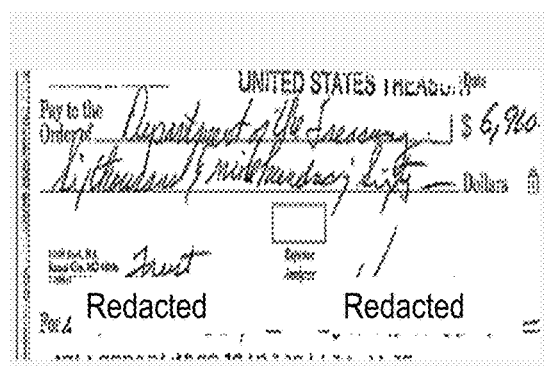
FIG. 5A and FIG. 5B depict examples of a check image before and after pre-processing, respectively, according to one or more exemplary embodiments of the present disclosure.
Figure 5B:
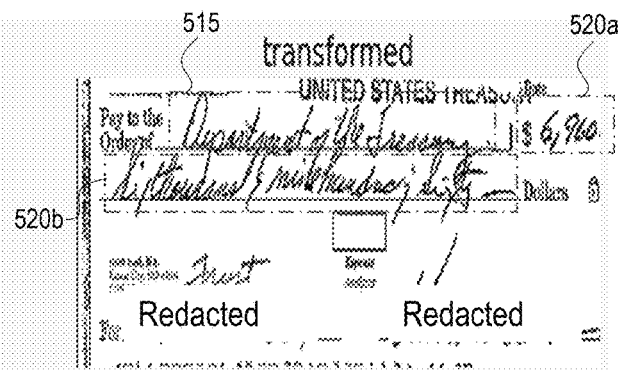

FIG. 5A depicts a sample handwritten check image 510a (110) obtained according to step s101 of process 100 and FIG. 5B depicts the sample handwritten check image 510b after pre-processing according to step s202 of process 200. As illustrated in FIGS. 5A and 5B, check image 510b after the pre-processing includes increased contrast for the printed and handwritten portions and, for example, in and around the areas for the payee name 515, payment amount 520a, and payment amount description 520b. Thus, check image 510b would be suitable for step s203 of process 200 for determining a document type, wherein the pixel intensity value of 208 of check image 510b would be below a threshold of 230 and be thereby identified as a handwritten check image.

FIG. 6A, FIG. 6B, FIG. 6C, FIG. 6D, FIG. 6E, and FIG. 6F illustrate sample check image portions 610a, 610b, 610c, 610d, 610e, and 610f, respectively, that result from pre-processing according to step s202 of process 200 with pixel intensity values determined according to step s203 of process 200 for distinguishing between handwritten checks and printed checks. Each of image portions 610a, 610b, 610c, 610d, 610e, and 610f includes a 70 by 70 pixel area (70, 70) and a pixel intensity value based on a mean intensity among the pixels within the area of the respective image portions 610a, 610b, 610c, 610d, 610e, and 610f. As shown in these figures, the image portions 610a, 610b, 610c, 610d, 610e, and 610f have pixel intensity values of 225.08, 221.07, 222.39, 219.03, 220.8, and 236.66, respectively. In this example, a mean pixel intensity of image portions 610a, 610b, 610c, 610d, 610e, and 610f is 224.17, which is below the threshold of 230 and indicates a handwritten document.

Figure 7:
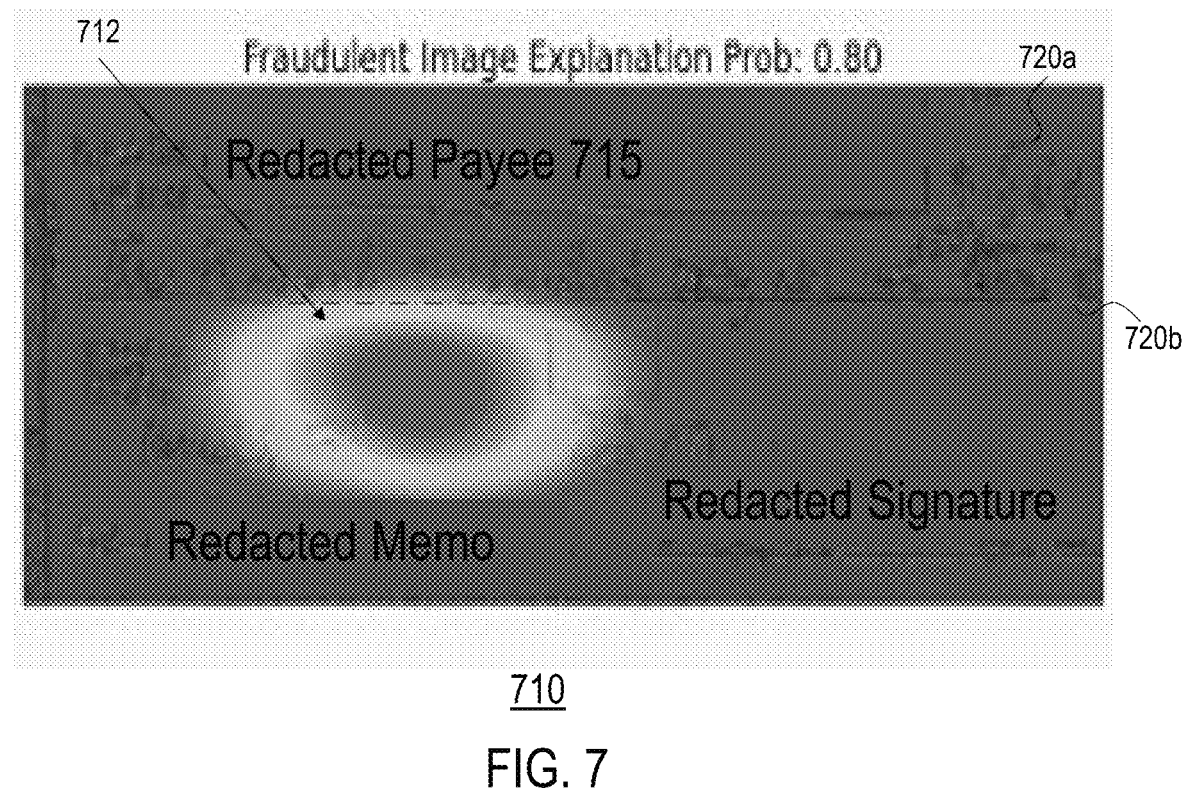
FIG. 7 depicts a sample heatmap indicating fraud probabilities for a check image according to one or more exemplary embodiments of the present disclosure.

FIG. 7 depicts a sample heatmap 710 indicating fraud probabilities for a handwritten check image (110) outputted at step s206 of process 200. As shown in FIG. 7, heatmap 710 includes contrasting shades (and/or colors, e.g., a red-blue spectrum) with an area 712 having a contrasting shade (e.g., red from blue) that indicates a location associated with a heightened fraud probability, for example, 0.80 (or 80%) as shown in FIG. 7 or $f_{phw}=0.80$ and >0.60 (or >0.70 or <0.85). As further illustrated in FIG. 7, area 712 is proximate the payment amount description area 720b of the underlying handwritten check image (110). Thus, an operator can readily review and confirm fraud indicia (e.g., material alteration(s)) in payment amount description area 720b, as well as payee area 715 and payment amount area 720a. In this example, the $f_{phw}<0.85$ indicates non-fraud under a more stringent fraud detection threshold.

Figure 8A:
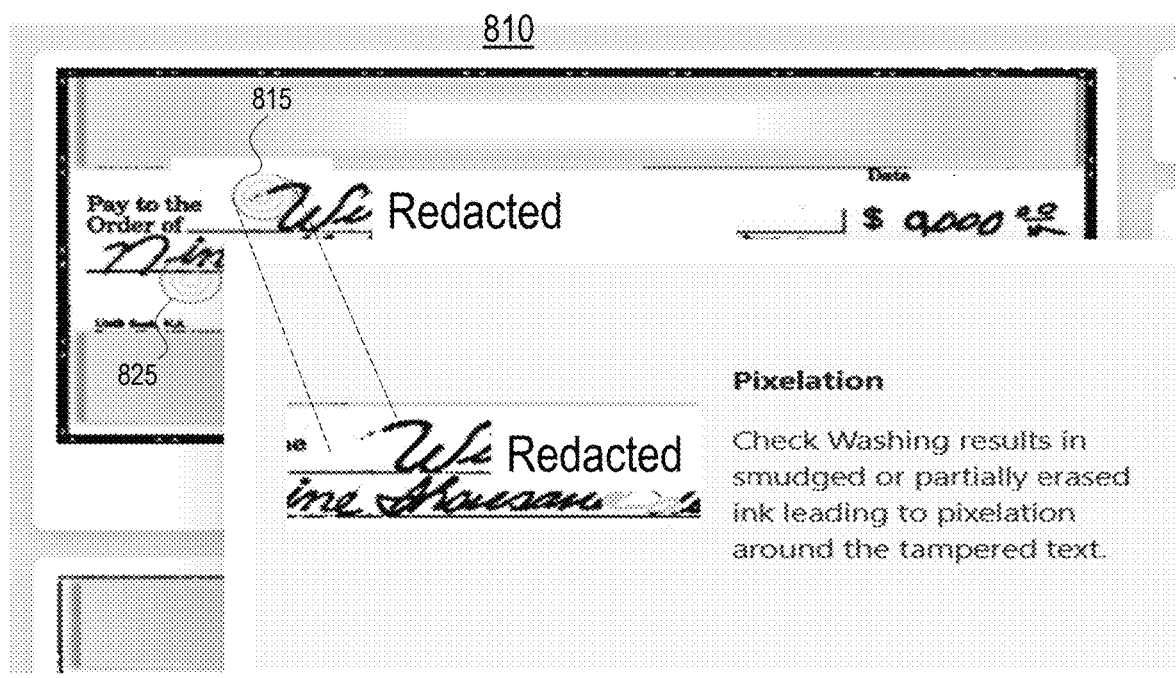
FIG. 8A, FIG. 8B, and FIG. 8C show sample handwritten check image portions with highlighted fraud indicia that are recognized according to one or more exemplary embodiments of the present disclosure.
Figure 8B:
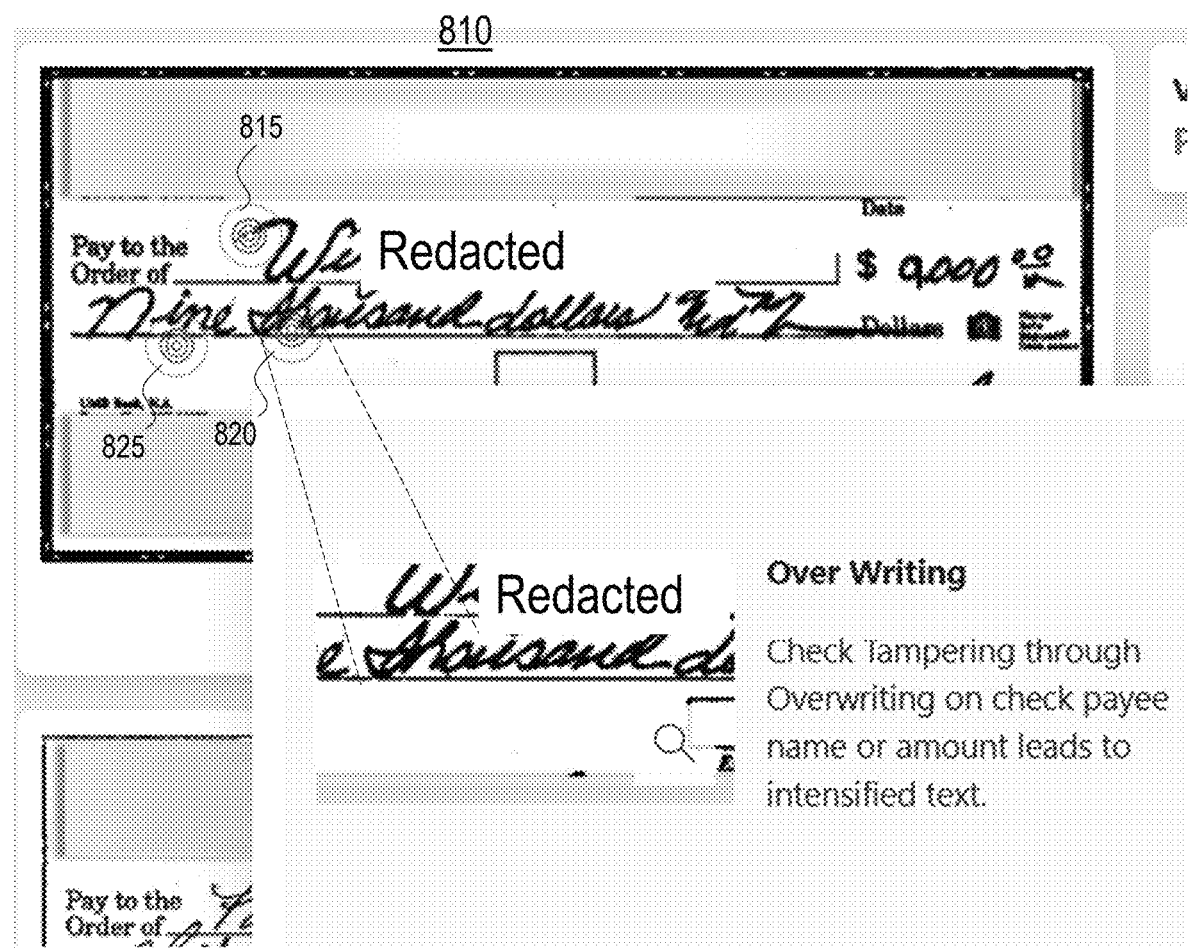
Figure 8C:
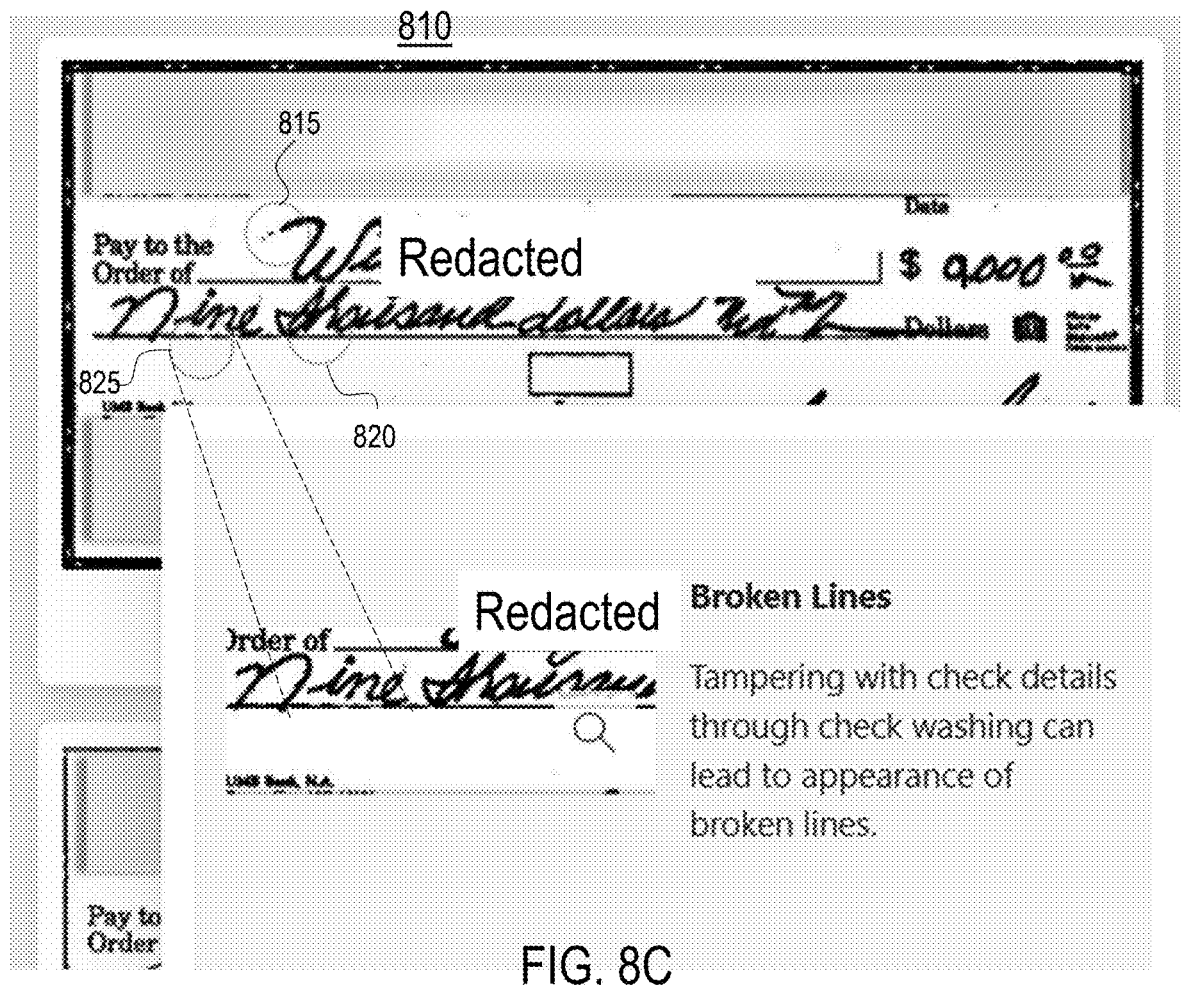

FIG. 8A, FIG. 8B, and FIG. 8C show portions of a sample handwritten check image 810 (110) with highlighted fraud indicia that the ML algorithm used at step s204 of process 200 is trained to recognize according to one or more exemplary embodiments of the present disclosure. Correspondingly, an operator can quickly and easily confirm one or more of these types of fraud indicia (e.g., material alterations to check image 810) by focusing, for example, at or near area 712 shown in FIG. 7. According to one or more exemplary implementations, one or more of the fraud indicia illustrated in FIGS. 8A, 8B, and 8C can be applied to the ML algorithm used at step s205 of process 200 for analyzing printed documents, e.g., checks, as well as to the ML algorithm used at step s303 of process 300 for signature authentication.

FIG. 8A illustrates pixelation at indicated area 815 on sample handwritten check image 810, where smudges and partial erasure of handwritten ink leads to pixelation of the scanned and obtained check image 810. Accordingly, a material alteration to the check image 810 is detected and can indicate fraudulent alteration, for example, check washing. In FIG. 8A, the material alteration is to the payee corresponding to area 515 illustrated in FIG. 5B and area 715 illustrated in FIG. 7.

FIG. 8B illustrates overwriting at an indicated area 820 on check image 810, where intensified text is detected to indicate a material alteration to a handwritten portion on check image 810 by being overwritten. Such overwriting on the payee and/or the payment amount of a check can indicate check tampering. In FIG. 8B, the material alteration is to the payment amount description corresponding to area 520b illustrated in FIG. 5B and area 720b illustrated in FIG. 7.

FIG. 8C illustrates broken lines at an indicated area 825 on check image 810, where a broken line at the underline for the payment amount description indicates a material alteration in check image 810. Check tampering that involves, for example, erasures can result in broken lines. Thus, detected broken lines can indicate fraudulent tampering, especially at or near areas associated with the payee and the payment amount of a check. In FIG. 8C, the material alteration is to the payment amount description corresponding to area 520b illustrated in FIG. 5B and area 720b illustrated in FIG. 7.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). To facilitate understanding, like reference numerals have been used, where possible, to designate like elements common to the figures. In certain instances, a letter suffix following a dash ( . . . -b) denotes a specific example of an element marked by a particular reference numeral (e.g., 210-b). Description of elements with references to the base reference numerals (e.g., 210) also refer to all specific examples with such letter suffixes (e.g., 210-b), and vice versa.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof, and are meant to encompass the items listed thereafter and equivalents thereof as well as additional items.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting.

While the disclosure has described several example implementations, it will be understood by those skilled in the art that various changes can be made, and equivalents can be substituted for elements thereof, without departing from the spirit and scope of the disclosure. In addition, many modifications will be appreciated by those skilled in the art to adapt a particular instrument, situation, or material to embodiments of the disclosure without departing from the essential scope thereof. Therefore, it is intended that the disclosure not be limited to the particular embodiments disclosed, or to the best mode contemplated for carrying out this disclosure, but that the disclosure will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope encompassed by the present disclosure, which is defined by the set of recitations in the following claims and by structures and functions or steps which are equivalent to these recitations.

What is claimed is:

1. A method, comprising:
   obtaining, at a processing apparatus, a plurality of document images;
   performing, at the processing apparatus, a material alteration detection process and a separate signature forgery detection process on the obtained plurality of document images, wherein
   the material alteration detection process comprises:
      automatically sampling, at the processing apparatus, a subset of the obtained plurality of document images based at least in part on account information indicated on the obtained plurality of document images;
      performing, at the processing apparatus, image pre-processing on the sampled subset of the obtained plurality of document images;
      determining, at the processing apparatus, a document type for each image of the sampled subset of the obtained plurality of document images, the document type indicating one of at least a handwritten document type and a printed document type;
      upon determining the handwritten document type for one or more document images of the sampled subset of the obtained plurality of document images, analyzing, at the processing apparatus, the one or more document images using a machine learning (ML) algorithm trained to detect material alterations on handwritten documents; and
      outputting, at the processing apparatus, a fraud probability representation for each analyzed document image, and
   the signature forgery detection process comprises:
      performing, at the processing apparatus, image pre-processing on the obtained plurality of document images;
      obtaining, at the processing apparatus, one or more past signatures corresponding to each of the obtained plurality of document images;
      performing, at the processing apparatus, signature image pre-processing on each obtained past signature;
      authenticating, at the processing apparatus, each signature included in the obtained plurality of document images using the obtained one or more past signatures and a ML algorithm trained to match signatures;
      outputting, at the processing apparatus, a similarity measure for each authenticated signature from the ML algorithm trained to match signatures;
      adjusting, at the processing apparatus, a threshold associated with the outputted similarity measure based on additional account information associated with each said authenticated signature;
      comparing, at the processing apparatus, the outputted similarity measure to the adjusted threshold; and
      outputting, at the processing apparatus, an alert upon determining that the outputted similarity measure fails to meet the adjusted threshold,
      wherein the ML algorithm trained to detect material alterations on handwritten documents is trained by under-sampling "non-fraud" documents.

2. The method of claim 1, wherein the sampling comprises sampling a maximum threshold number of document images for a corresponding one or more accounts associated with the obtained plurality of document images based on the account information.

3. The method of claim 1, wherein the image pre-processing on the sampled subset of the obtained plurality of document images comprises increasing a contrast of the sampled subset of the obtained plurality of document images.

4. The method of claim 1, wherein the determining comprises comparing a pixel intensity for each said image to a pixel intensity threshold.

5. The method of claim 4, wherein the handwritten document type is determined when the pixel intensity is above the pixel intensity threshold.

6. The method of claim 4, wherein the printed document type is determined when the pixel intensity is at or below the pixel intensity threshold, and
   wherein the method further comprises, upon determining the printed document type for one or more document images of the sampled subset of the obtained plurality of document images, analyzing the one or more document images using a ML algorithm trained to detect material alterations on printed documents.

7. The method of claim 6, wherein the ML algorithm trained to detect material alterations on printed documents is trained by under-sampling "non-fraud" documents.

8. The method of claim 7, wherein the under-sampling corresponds to a process of the sampling of the subset of the obtained plurality of document images.

9. The method of claim 1, wherein the fraud probability representation comprises a heatmap that indicates one or more locations associated with a heightened fraud probability.

10. The method of claim 1, wherein the additional account information comprises a margin of error among a plurality of past signatures for an account associated with the outputted similarity measure, and
the adjusting comprises adjusting the threshold according to the margin of error.

11. An apparatus, comprising:
a processor; and
one or more memory storage devices operatively connected to the processor and having stored thereon machine-readable instructions that, when executed, cause the processor to:
obtain a plurality of document images;
perform a material alteration detection process and a separate signature forgery detection process on the obtained plurality of document images, wherein
the one or more memory storage devices have stored thereon machine-readable instructions for the material alteration detection process that, when executed, cause the processor to:
automatically sample a subset of the obtained plurality of document images based at least in part on account information indicated on the obtained plurality of document images;
perform image pre-processing on the sampled subset of the obtained plurality of document images;
determine a document type for each image of the sampled subset of the obtained plurality of document images, the document type indicating one of at least a handwritten document type and a printed document type;
upon determining the handwritten document type for one or more document images of the sampled subset of the obtained plurality of document images, analyze the one or more document images using a machine learning (ML) algorithm trained to detect material alterations on handwritten documents; and
output a fraud probability representation for each analyzed document image, and
the one or more memory storage devices have stored thereon machine-readable instructions for the signature forgery detection process that, when executed, cause the processor to:
perform image pre-processing on the obtained plurality of document images;
obtain one or more past signatures corresponding to each of the obtained plurality of document images;
perform signature image pre-processing on each obtained past signature;
authenticate each signature included in the obtained plurality of document images using the obtained one or more past signatures and a ML algorithm trained to match signatures;
output a similarity measure for each authenticated signature from the ML algorithm trained to match signatures;
adjust a threshold associated with the outputted similarity measure based on additional account information associated with each said authenticated signature;
compare the outputted similarity measure to the adjusted threshold; and
output an alert upon determining that the outputted similarity measure fails to meet the adjusted threshold,
wherein the ML algorithm trained to detect material alterations on handwritten documents is trained by under-sampling "non-fraud" documents.

12. The apparatus of claim 11, wherein the sampling comprises sampling a maximum threshold number of document images for a corresponding one or more accounts associated with the obtained plurality of document images based on the account information.

13. The apparatus of claim 11, wherein the image pre-processing on the sampled subset of the obtained plurality of document images comprises increasing a contrast of the sampled subset of the obtained plurality of document images.

14. The apparatus of claim 11, wherein the determining comprises comparing a pixel intensity for each said image to a pixel intensity threshold.

15. The apparatus of claim 14, wherein the handwritten document type is determined when the pixel intensity is above the pixel intensity threshold.

16. The apparatus of claim 14, wherein the printed document type is determined when the pixel intensity is at or below the pixel intensity threshold, and
wherein the one or more memory storage devices have further stored thereon machine-readable instructions for the material alteration detection process that, when executed, cause the processor to: upon determining the printed document type for one or more document images of the sampled subset of the obtained plurality of document images, analyze the one or more document images using a ML algorithm trained to detect material alterations on printed documents.

17. The apparatus of claim 16, wherein the ML algorithm trained to detect material alterations on printed documents is trained by under-sampling "non-fraud" documents.

18. The apparatus of claim 17, wherein the under-sampling corresponds to a process of the sampling of the subset of the obtained plurality of document images.

19. The apparatus of claim 11, wherein the fraud probability representation comprises a heatmap that indicates one or more locations associated with a heightened fraud probability.

20. The apparatus of claim 11, wherein the additional account information comprises a margin of error among a plurality of past signatures for an account associated with the outputted similarity measure, and
the adjusting comprises adjusting the threshold according to the margin of error.

* * * * *